July 29, 1952  S. H. B. ZACHARIASSEN ET AL  2,605,185
METHOD OF PRODUCING MARGARINE, BUTTER, AND
SIMILAR PRODUCTS
Filed Dec. 20, 1949

INVENTORS
STIG H. BJARNE ZACHARIASSEN
ALFRED G. BORCK
BY *Davis Hoxie & Faithfull*
ATTORNEYS Patented July 29, 1952

2,605,185

UNITED STATES PATENT OFFICE 2,605,185

METHOD OF PRODUCING MARGARINE, BUTTER, AND SIMILAR PRODUCTS

Stig H. Bjarne Zachariassen, Stockholm, and Alfred G. Borck, Tullinge, Sweden, assignors to Aktiebolaget Separator, Stockholm, Sweden, a corporation of Sweden Application December 20, 1949, Serial No. 134,018
In Sweden December 23, 1948

17 Claims. (Cl. 99—119)

This invention relates to the production of margarine, butter and similar products, and has for its principal object the provision of an improved process for this purpose.

The conventional methods for the production of margarine, and those processes for buttermaking in which pure butter fat is used as raw material, have this in common: The constituents to be contained in the final product are mixed at a temperature of 35 to 60° C., atomized or dispersed in one another into a stable dispersion or a viscous high-per-cent fat emulsion having the degree of dispersion desired in the final product, and finally cooled together to a temperature between 0 and 16° C. The various methods differ from one another in the manner in which the atomization is carried out, for example, by agitation in a churn or by homogenization; but they differ chiefly with respect to the manner of cooling the emulsion. The cooling of the product may be effected in any one of three ways, namely (1) in tube coolers, which are generally provided with rotating rollers and scrapers along the rollers, (2) by means of rotating cooling drums from which the product is scraped in the form of more or less coherent flakes after the cooling, (3) by injecting the product directly into a cooling liquid. When the first-mentioned cooling method is used, it is generally difficult to attain the rate of cooling desirable with regard to the crystallization and, besides, there is a tendency to unevenness in the cooling which, in turn, results in variations in the crystallization in different parts of the material. The second of the cooling methods mentioned above enables very rapid cooling of the product, provided that the temperature of the cooling liquid, and consequently that of the rollers, is sufficiently low. It is common practice for the cooling liquid to be kept at a temperature of —15° C. However, with this low temperature, the costs of operation become very high and, in addition, cooling drums have the disadvantage of being difficult to regulate, particularly when it is desirable to determine the temperature in view of the different requirements as to crystallization. Very powerful working is also required after the cooling in order to produce a coherent material. This explains why the third or old method, that is, direct cooling by washing with cold water, is still in use. However, this method has the great disadvantage that the product absorbs considerable amounts of water during the cooling, which must subsequently be removed by working. It is thus evident that great difficulties are encountered in so designing the cooling apparatus that it will enable even cooling of the product and at the same time enable the high cooling rate which gives a fine texture to the product, when highly viscous emulsions are treated.

The atomization of the product also causes certain difficulties when the methods referred to above are used. For example, by means of the atomization, effected at about 50° C. in a churn, the mixture must be stabilized so efficiently that it does not undergo any changes during the subsequent cooling and mechanical working. Especially in the case of highly concentrated emulsions, there is a marked tendency to breaking of the emulsion when the cooling is effected simultaneously with the mechanical working, and a relatively large amount of high quality emulgent must therefore be added to ensure stabilization.

According to the present invention, the constituents to be contained in the finished product are mixed with one another in the form of two or more components, for example, a water component and a fat component, one of which has a considerably lower solidification point and/or viscosity than the other or others and therefore can be more readily cooled to low temperature, the components also occurring in fluid phase when being mixed. With the new method, the disadvantages referred to in the foregoing are largely overcome in the following ways: By mixing the components in a continuous flow; by the component with lower solidification point and/or viscosity having a lower temperature than that of the other component or components during mixing; by giving the final degree of atomization, or at least a substantial part thereof, to the components during the mixing operation; and by effecting the mixing and the atomizing so rapidly that the equalization of temperature between the components takes place mainly after the atomization, the components prior to the mixing preferably having such temperatures that the temperature of the product after the temperature equalization is no higher than the solidification point of the fat contained in the product.

In the method according to the invention, it is important that the components are mixed in the proper manner. Assuming as the simplest imaginable case that one component consists of pure fat and the other of salt water, and that the fat can be cooled to approximately 25° C. without solidifying and the salt water to —6° C., and further that the components are injected at a rate of 30 and 5 m./sec., respectively, into a mixer, the dimension of which in the direction of injection is in the order of a few millimeters, the time required by the two components to penetrate into or be atomized in one another will be very short, for example, about 1/1000 sec., and consequently no considerable equalization of the temperature can take place between the components, so that water drops having a diameter of 5 to 15 µ, and a temperature of approximately −5 to −6° C. will be embedded in fluid fat with a temperature of 20 to 25° C. However, owing to the large contact surface between the two components, the temperature will be equalized very quickly and a considerable cooling of the material (fat) will result. If the fat component is 82% by volume, a temperature of the mixture of 16 to 18° C. can be attained. As the crystallization of the fat proceeds, crystallization heat is generated. This is preferably conducted away by a simple after-cooling, for example, by storing the product in pieces of suitable size in a refrigerating room.

For a better understanding of the invention, reference may be had to the accompanying drawing, in which Fig. 1 is a sectional view of a simple device for mixing the components;

Figure 1:
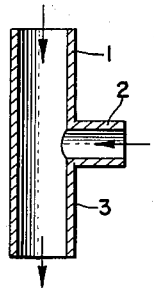

Referring to Fig. 1, the mixer comprises a tube 1 through which fluid fat is forced in the direction of the arrow at a rate of 10 to 20 m./sec. Perpendicular to and communicating with tube 1 is a tube 2, through which salt water is fed at a rate of 3 to 5 m./sec. and forced into the fat passing through tube 1. Owing to the distribution of velocity in the cross sectional area of the outlet 3, a certain velocity gradient is obtained therein, creating cutting forces by which the water globules forced into the fat are atomized. This simple form of mixer can be used when there are only moderate requirements with regard to the atomization of the water in the fat, and when the mixture is discharged at a relatively high temperature, for example, 18° to 22° C., and is subsequently cooled. It has proved possible to atomize water drops by means of this simple device, and to reduce the diameter to an average of 10 to 15 µ, that is, the drops will have the same size as those in ordinary churned butter.

Figure 2:
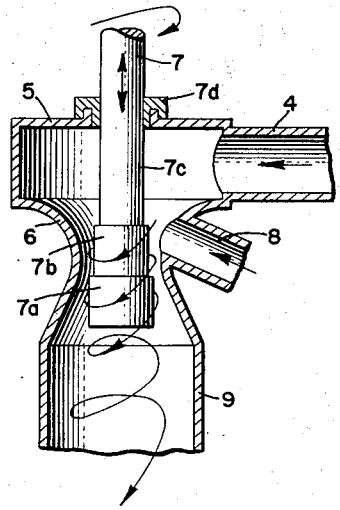
Fig. 2 is a similar view of a more elaborate form of the mixing device.

If higher requirements must be met in the atomization of the water in the fat, for example, if water drops of a size of 5 to 10 µ are required, that is, water drops of the same size as those contained in butter produced from highly concentrated cream, a mixer of the type shown in Fig. 2 should be used. The fat component is fed through an inlet 4 into a cylindrical chamber 5, one end-wall of which is in the form of a nozzle 6 serving as an outlet from the chamber 5. In the nozzle 6 is a central rotatable pin 7, which rotates at a peripheral speed of 1 to 5 m./sec. during the mixing. The water component is fed into the chamber 5 through an inlet 8, and is mixed with the fat in nozzle 6. By the rotation of the pin 7, cutting forces which cause the water drops to be atomized are created in the liquid flowing between the nozzle and the pin. With this device, the size of the water drops in the fluid material discharging through the outlet 9 will be very uniform. The pin 7 is provided with several different diameters 7a, 7b and 7c and is movable axially, which makes it possible to vary the through-flow area of the nozzle 6. At the place where the pin 7 extends through the wall of chamber 5, it is surrounded by a packing device 7d, which may be a stuffing box of any known type. Other types of mixers may be used as well in which, simultaneously with the atomization, such mixing of the components is effected that they become evenly distributed in one another.

Figure 3:
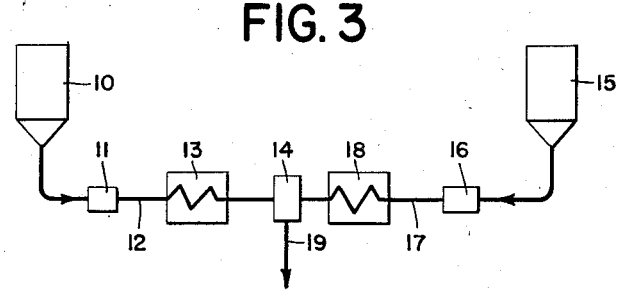
Fig. 3 is a schematic view of an installation for use in practicing the new method in the production of margarine.

Referring now to Fig. 3, the numeral 10 designates a container in which the constituents of the fat component are mixed with one another at a temperature somewhat higher than the melting point of the fat. If required, this container may be provided with heating and stirring devices. The fat component is forced by a pump 11 through a pipe 12 into a cooler 13 in which it is cooled either to a temperature somewhat above the solidification point of the material, or is cooled below this temperature while maintaining its liquid state. The material is then brought to the mixer 14, which is of the type previously described. At the same time, the water component, coming from a tank 15 and preferably containing the requisite additives, such as salt and other flavoring agents, is also fed into the mixer 14. Before entering the mixer, this component is forced by a pump 16 through a pipe 17 into a cooler 18 in which it has been cooled to suitable temperature. In the mixer 14, the water is atomized in the fat in the manner described above, and the finished mixture is withdrawn through a pipe 19. The cooling of the water component in the cooler 18 should be carried to such a point that, after mixing and temperature equalization, the temperature of the product from pipe 19 is lower than or approximately equal to the solidification temperature of the fat contained in it.

It is not necessary that the component withdrawn from container 10 be pure fat or that the component arriving from tank 15 be an aqueous solution. The two components may also consist of emulsions of varying concentration. Thus, a high concentration fat emulsion having a fat content of 82% or more may be fed from container 10, and from tank 15 a low concentration fat emulsion. The two components may also contain fat with different solidification points, whereby the component forming the outer phase should preferably contain the fat having the higher solidification point. According to the solubility in fat or water, emulgators may be added to either one or both of the components. In order to remove the crystallization heat of the fat, the margarine or butter discharging from the mixer through outlet 19 is subjected to after-cooling, for example, in a refrigerating room, or in any other known manner, for example, in a cooling device of the type which consists of one or more series-coupled elements, in which the low viscosity material coming from the mixer is forced to pass through the space between a rotor, provided with screw-like propelling members, and a cooled housing surrounding the rotor, whereby the material is subjected to further mixing.

Any addition of stabilizing agents, when using the new method, is not required in principle, because the increase in viscosity of the fat during the cooling, and the crystallization of the fat around the water drops, very effectively prevent a separation of the components. However, in view of the qualities of the product at high temperatures, for example, when it is used for frying, it may be advantageous to add an emulgator.

The method according to the invention also has further advantages. No difficulties are encountered in cooling the fat, because its temperature is relatively high during the cooling. In this respect it is preferable to use pure fat, because its viscosity is lower than that of highly concentrated emulsions at the same temperature. It has been found that pure butter fat and the fat generally used in margarine manufacture may be cooled in continuous flow to a temperature between 17 and 20° C. without solidifying, provided the fat is passed through the cooler at a sufficiently high rate, for example, 3 to 5 m./sec. The fat thereby becomes below its solidifying point while retaining its fluid state as long as it is kept in motion. In this way, the temperature of the fat to be fed into the mixer can be kept so low that, after temperature equalization, a temperature of the mixture of 11 to 13° C. may be attained, if required.

The process according to the invention makes it possible to produce margarine and butter from so-called globular fat. In butter made by the ordinary churning process or from highly concentrated cream, a part of the fat occurs in the form of fat globules enclosed by a diaphragm. This globular fat, along with the water drops, is contained in the outer continuous fat phase, and its presence is due to the fact that part of the fat globules of the cream have remained unaffected during the phase reversal. It is believed that the difference in consistency between margarine and ordinary butter is largely due to the absence of globular fat in margarine. This is usually the case also when the raw material used in margarine manufacture is an emulsion of the fat-in-water type, that is, a kind of artificial cream. To some extent this can probably be explained by assuming that the stabilization of the margarine fat obtainable with the emulgators used in margarine manufacture is not as good as that given to the butter fat globules by the natural stabilizors contained in milk, but the reason is very likely to be found also in the intense mechanical working to which the margarine is subjected during and after the cooling. With the method according to the invention, the margarine will contain a certain proportion of globular fat, because one of the components used in the mixture is an emulsion. Provided the fat content of the emulsion is not too high, for example, about 20 to 40%, no appreciable difficulties are encountered in maintaining the fat in globular form during the cooling. At this concentration, the fat globules "swim" in the water at some distance from one another, and no breaking of the emulsion will result from the cooling. Conditions are different, however, when a highly concentrated cream is used, containing, for example, 80% fat or more. At this concentration, the fat globules are so close to one another, and therefore deformed, that breaking of the emulsion or phase reversal is unavoidable or almost unavoidable. As the proportion of globular fat can thus be regulated, it becomes possible to manufacture a product which, with regard to consistency, has the greatest possible resemblance to ordinary butter.

It is generally desirable that the disperse phase have the lower temperature, as the consistency of margarine is mainly dependent upon the outer phase. The disperse phase thereby acts as a cooling medium and, owing to its high degree of atomization, ensures a cooling of the continuous phase rapid enough to result in formation of the smallest possible crystals during the crystallization.

It should finally be noted that margarine and butter made in accordance with the invention show good keeping qualities both biologically and with regard to oxidation, especially when certain additives are used, for example, lecithin.

We claim:

1. A method of producing butter, margarine, and the like, from at least two fluid components, one of which contains fat, and another of which is to be a dispersed phase of the finished product, which comprises adjusting the temperatures of the components to values such that their average temperature, when mixed in the ratio desired in the finished product, is lower than the solidification point of fat in said fat component, rapidly mixing said components at said temperatures and in said ratio and atomizing the dispersed phase component in said fat component before a substantial part of the fat has crystallized, and removing from the product the crystallization heat of the fat while maintaining said atomization of the dispersed phase substantially unaltered.

2. A method according to claim 1, in which said fat component is at least mainly fat, and in which said dispersed phase component is at least mainly water.

3. A method according to claim 1, in which said fat component is at least mainly a fat emulsion, and in which said dispersed phase component is mainly water.

4. A method according to claim 1, in which said fat component is at least mainly fat, and in which said dispersed phase component is at least mainly a fat emulsion.

5. A method according to claim 1, in which each of said components consists of an emulsion of water and fat, the two emulsions having diffeernt fat concentrations, the component having the lower fat concentration constituting the dispersed phase component.

6. A method according to claim 1, in which said dispersed phase component is an emulsion of the fat-in-water type.

7. A method according to claim 1, in which said dispersed phase component contains salt.

8. A method according to claim 1, in which said dispersed phase component contains a flavoring additive.

9. A method according to claim 1, in which, prior to said mixing operation, the temperature of the fat component is not substantially higher than the solidification point of the fat.

10. A method according to claim 1, in which the temperature of the dispersed phase component prior to the mixing is below 0° C.

11. A method according to claim 1, in which said components have different viscosities, the component with the lowest visocity having the lowest temperature prior to said mixing.

12. A method according to claim 1, in which said components are brought together in streams for said mixing.

13. A method according to claim 1, in which said components are brought together in streams for said mixing, the atomizing of the dispersed phase being effected, during the mixing, to the degree desired in the final product.

14. A method according to claim 1, in which said components are brought together in streams for said mixing, the mixing and atomizing being effected by rotation of said components.

15. A method according to claim 1, in which at least one of the components is a fat emulsion.

16. A method according to claim 1, in which said components have different temperatures prior to said mixing, said mixing and atomizing being effected before substantial temperature equalization of the components has occurred.

17. A method according to claim 1, in which prior to said mixing, the fat component is cooled to a temperature at least as low as the solidification point of the fat, while maintaining the fat in liquid form.

STIG H. BJARNE ZACHARIASSEN.
   ALFRED G. BORCK.

REFERENCES CITED

The following references are of record in the file of this patent:

UNITED STATES PATENTS

| Number | Name | Date |
|---|---|---|
| 2,395,051 | Horneman et al. | Feb. 19, 1946 |
| 2,466,894 | Horneman et al. | Apr. 12, 1949 |